TREATMENT OF RESIN COAGULATE WITH RUBBER LATEX TO REMOVE RESINOUS FINES

Richard R. Blair, Marietta, Ohio, and Charles A. Padgitt, Parkersburg, W. Va., assignors to Borg-Warner Corporation, Chicago, Ill., a corporation of Illinois
No Drawing. Filed May 25, 1962, Ser. No. 197,582
5 Claims. (Cl. 260—4)

This invention relates to the dedusting of resins and more particularly to a process of treating resinous slurries at the coagulation stage of resin production to agglomerate the smaller particles therein, the smaller particles or fines being objectionable during processing and/or fabrication.

In brief, it has been found that the coagulation of a small amount of diluted rubbery latex in a prior coagulated resinous slurry will cause agglomeration of the smaller resin particles or fines by providing a rubbery matrix for them to adhere to.

Throughout this application reference will be made to resins and rubbers. By resin it is meant a material that is below its second order transition temperature. Examples of resins that may be treated in accordance with this invention are: butadiene-styrene resins, i.e., resins having a low butadiene content; acrylonitrile-butadiene-styrene resins; styrene-acrylonitrile resins; styrene resins; polyvinyl halide resins, such as vinyl chloride and the like; vinyl esters, such as vinyl acetate, butyrate, etc.; acrylic resins, such as acrylic acid, methacrylic acid, ethylacrylate, acrylonitrile, etc.; mixtures thereof; and the like. When referring to rubber, it will be understood that a rubber is a material that is above its second order transition temperature. Examples of rubbers that may be used to treat the resins in accordance with this invention are such materials as butadiene-styrene, i.e., materials having a relatively high butadiene content; polyisobutylene; copolymers of isoprene or butadiene and isobutadiene; butadiene-acrylonitrile; natural rubber; polybutadiene; rubbery polyurethanes; mixtures thereof; and the like.

As the structure may change in rubbers and resins at different temperatures, the second order transition temperature provides an important distinction between rubber and resin. For example, natural rubber is a rubber at normal temperatures but a resin at extremely low temperatures. Polystyrene, on the other hand, is a resin at ordinary temperatures but becomes rubbery at high temperatures. Rubbery substances are soft, tacky materials at normal temperatures, whereas resins are hard materials at normal temperatures.

Fines or dust will be hereinafter referred to as those particles that will pass through either a 100- or 200-mesh screen. A 100-mesh screen has openings of 149 microns square and a 200-mesh screen has openings of 74 microns square. Throughout the examples the amount of fines in percent is equated with the weight percent of particles that will pass through a 100- or 200-mesh screen, as indicated in Tables I, II, III, and IV.

The amount of rubber on a dry weight basis in the dilute rubbery latex solution that is added to the coagulated resin latex. The rubber latex contained in the dilute of the resin on a dry weight basis present in the coagulated resin latex. The rubber contained in the dilute rubbery latex solution may vary from two to seven parts rubber latex per 100 parts demineralized water. When referring to the ratio of rubber to resin in the examples and claims it must be remembered that the amount of rubber and resin was not calculated on the basis of rubbery latex or resin latex, but on the basis of dry rubber and dry resin. The smaller amount, i.e., one-eighth percent rubber in the dilute rubbery latex, normally will not agglomerate all of the fines in a resin slurry; for this reason slightly greater than one-eighth percent is preferred. The amount of rubber in the dilute rubbery latex need not in any case exceed two percent of the resin contained in a resin slurry. The amount of rubber added to the resin slurry will in no case exceed that amount which affects the physical and chemical properties of the resinous material to which it is added.

In each example a resin latex is treated at the coagulation stage of production, washed, separated from its aqueous solution, and dried. The amount of fines obtained prior to treatment and after treatment are recorded in Tables I, II, III and IV, all parts and percentages in the examples being by weight.

In the following examples the parts resin and parts rubber were calculated on the basis of dry rubber to dry resin. Also, the coagulant solution was made up using sulfuric acid and aluminum sulfate. The kind of coagulant solution used is not critical to this invention; and other solutions, such as hydrochloric acid solutions, nitric acid solutions, etc., could have been used. Sulfuric acid and aluminum sulfate were used merely to illustrate the operability of the invention.

EXAMPLES 1–7

A dilute solution of coagulant was made up of 100 parts tap water containing about .4 percent concentrated sulfuric acid. The coagulant solution was heated to about 130° F. A 37 percent solids resin latex, comprised of 15 parts butadiene and 85 parts styrene, was combined with the dilute coagulant solution. The amount of resin latex combined with the coagulant solution was about 33 percent of the weight of the solution. The resulting mixture was heated to 155° F. by injecting steam therein. The resin latex coagulated to a resin-water slurry, and one half of the resin slurry was removed to serve as a control. A dilute solution (3½ parts rubber per 100 parts demineralized water) of 50 percent solids rubber latex of 50/50 styrene/butadiene was added to the remaining resin slurry and coagulated therein. The total amount of rubber added as a dilute latex solution, as indicated in Table I for Examples 1–7, was one-eighth to two parts rubber per 100 parts resin, each calculated on dry basis. The slurry was cooled to 80° F. with tap water. The coagulated resins, i.e., the treated sample and the control sample, were separated from their respective aqueous solutions, washed and dried at about 140° F. for 16 hours. This experiment was repeated with different amounts of rubber in latex form, as indicated, and the results are tabulated under Examples 1–7 in Table I.

Table I

In Examples 1–7, 100 dry parts of a resin latex of 15/85 butadiene/styrene was treated with the indicated dry parts of styrene/butadiene rubber latex.

| Example Number | Dry Parts of 50/50 Styrene Butadiene Rubber Latex | Percent Fines in Untreated Resin | Percent Fines in Treated Resin | Percent Reduction in Fines, Treated Resin |
|---|---|---|---|---|
| 1 | 2 | 10 | .0 | 100 |
| 2 | 1 | 10 | .0 | 100 |
| 3 | ½ | 10 | .0 | 100 |
| 4 | ¼ | 10 | .2 | 98 |
| 5 | ⅛ | 10 | .8 | 92 |
| 6 | ¼ | 10 | .3 | 97 |
| 7 | ¼ | 10 | .0 | 100 |

EXAMPLES 8–12

A dilute solution of coagulant was made up of 100 parts tap water containing about 0.6 percent concentrated sulfuric acid. The coagulant solution was heated to about 180° F. A 32 percent solids resin latex comprised of 30 parts butadiene, 45 parts styrene, and about 25 parts acrylonitrile was combined with the dilute coagulant solution. The amount of resin latex combined with the solution was about 33 percent of the weight of the solution. The resulting mixture was heated to 205° F. by injecting steam into it. The resin latex coagulated to a resin-water slurry, and one half of the resin slurry was removed to serve as a control. As indicated in Examples 8–12 in Table II, various rubber latices were added to the resin-water slurry. In each example the mixture was then agitated and coagulated. As indicated for Examples 8–12 in Table II, one part rubber, in the form of a dilute rubber latex, per 100 parts resin was added. The slurry was then cooled to 80° F. with tap water. The coagulated resins, i.e., the treated sample and the control sample, were separated from their respective aqueous solutions, washed and dried at about 140° F. for 16 hours.

*Table II*

In Examples 8–12, 100 dry parts of a resin latex of 25/30/45 acrylonitrile/butadiene/styrene was treated with one part of the indicated rubber latex.

| Example Number | One Dry Part Rubber Latex of— | Percent Fines in Untreated Resin | Percent Fines in Treated Resin | Percent Reduction in Fines, Treated Resin |
|---|---|---|---|---|
| 8 | 50/50 styrene/butadiene | 10.4 | .00 | 100.00 |
| 9 | Polybutadiene | 7.1 | .00 | 100.00 |
| 10 | 24/76 styrene/butadiene | 10.8 | 5.04 | 53.70 |
| 11 | 45/55 acrylonitrile/butadiene | 5.4 | .00 | 100.00 |
| 12 | Natural rubber | 6.4 | .53 | 91.71 |

EXAMPLES 13–17

A dilute solution of coagulant was made up of 100 parts tap water containing about 0.4 percent concentrated sulfuric acid. The coagulant solution was heated to about 190° F. A 36 percent solids resin latex comprised of 62.5 parts alpha methyl styrene, 7.5 parts styrene, and 30 parts acrylonitrile was combined with the dilute coagulant solution. The amount of resin latex combined with the coagulant solution was about 23 percent of the weight of the solution. The resulting mixture was heated to about 210° F. by injecting steam therein. The resin latex coagulated to a resin-water slurry, and one half of the resin slurry was removed to serve as a control. Several different rubber latices were added to the remaining slurry, as indicated in Table III. The mixture was agitated and coagulated, and the slurry was cooled to 80° F. with tap water. The coagulated resins, i.e., the treated sample and the control sample, were separated from their respective aqueous solutions, washed and dried at about 140° F. for 16 hours.

*Table III*

In Examples 13–17, 100 dry parts of a resin latex of 62.5/7.5/30 alpha methyl styrene/styrene/acrylonitrile was treated with one part of the indicated rubber latex.

| Example Number | One Dry Part Rubber Latex of— | Percent Fines in Untreated Resin | Percent Fines in Treated Resin | Percent Reduction in Fines, Treated Resin |
|---|---|---|---|---|
| 13 | 50/50 styrene/butadiene | 3.4 | .26 | 92.4 |
| 14 | Polybutadiene | 6.3 | 5.20 | 17.4 |
| 15 | 24/76 styrene/butadiene | 4.9 | 1.30 | 73.5 |
| 16 | 45/55 acrylonitrile/butadiene | 2.6 | .54 | 79.2 |
| 17 | Natural rubber | 1.9 | 1.60 | 15.8 |

EXAMPLES 18–22

A dilute solution of coagulant was made up of about .5 percent aluminum sulfate to 100 parts tap water. The solution was heated to 210° F. A 33 percent solids resin latex comprised of 15 parts acrylonitrile and 85 parts styrene was combined with the dilute solution of coagulant. The amount of resin latex combined with the coagulant solution was about 33 percent of the weight of the solution. The resulting mixture that had cooled during the combining of the resin latex was again heated to 210° F. by injecting steam. The resin latex coagulated to a resin-water slurry, and one half of the resin slurry was removed to serve as a control. Several different rubber latices were added to the remainder of the slurry, as indicated for the different examples in Table IV. The mixture was agitated and coagulated and the slurry was cooled to 80° F. by the addition of tap water. The coagulated resins, i.e., the treated sample and the control sample, were separated from their respective aqueous solutions, washed and dried at about 140° F. for 16 hours.

*Table IV*

In Examples 18–22, 100 dry parts of a resin latex of 15/85 acrylonitrile/styrene was treated with one part of the indicated rubber latex.

| Example Number | One Dry Part Rubber Latex of— | Percent Fines in Untreated Resin | Percent Fines in Treated Resin | Percent Reduction in Fines, Treated Resin |
|---|---|---|---|---|
| 18 | 50/50 styrene/butadiene | 12.10 | 1.90 | 84.3 |
| 19 | Polybutadiene | 7.10 | 2.60 | 63.4 |
| 20 | 24/76 styrene/butadiene | 12.10 | 7.60 | 37.2 |
| 21 | 45/55 acrylonitrile/butadiene | 14.10 | 7.00 | 50.4 |
| 22 | Natural rubber | 8.28 | 2.46 | 70.3 |

In view of the many changes and modifications that may be made without departing from the invention, reference should be made to the appended claims for the scope afforded this invention.

We claim:
1. The process of treating thermoplastic resins, below their second order transition temperature, to reduce fines therein, comprising the steps of:
  combining a dilute coagulant solution and latex of said resin selected from the group consisting of butadiene-styrene resin latices, acrylonitrile-butadiene-styrene resin latices, styrene-acrylonitrile resin latices, polystyrene resin latices, polyvinyl halide resin latices, polyacrylic acid resin latices, and mixtures thereof to thereby coagulate the resin therein;
  treating said coagulated resin by adding thereto a dilute rubber latex material, said rubber latex material being above its second order transition temperature, said rubber latex selected from the group consisting of butadiene-styrene rubber latices, polyisobutylene rubber latices, isoprene-butadiene rubber latices, butadiene-acrylonitrile rubber latices, natural rubber latices, polybutadiene rubber latices, polyurethane rubber latices, and mixtures thereof;
  said dilute rubber latex being added in sufficient amount to provide a dry rubber to dry resin ratio of from ⅛ part to 2 parts by weight rubber to 100 parts by weight resin;
  coagulating said rubber latex in said coagulant solution;
  separating the coagulated treated resin from its aqueous solution; and
  washing the treated resin with water and drying said resin to thereby provide a resinous material substantially free of fines.

2. The process of treating thermoplastic resins below their second order transition temperature to reduce fines therein, comprising the steps of:
  combining a coagulant solution comprised of about .4 part concentrated sulfuric acid per 100 parts tap water with a resin latex selected from the group consisting of butadiene-styrene resin latices, acrylonitrile-butadiene-styrene resin latices, styrene-acrylonitrile resin latices, polystyrene resin latices, polyvinyl halide resin latices, polyacrylic acid resin latices, and mixtures thereof to thereby coagulate the resin therein;
  treating said coagulated resin by adding thereto a dilute rubber latex, said rubber being above its second order transition temperature and coagulating said rubber latex in said coagulant solution, said rubber latex solution being added in sufficient amount to provide a dry rubber to dry resin ratio of from ⅛ part to 2 parts by weight rubber to 100 parts by weight resin;
  separating the coagulated treated resin from its aqueous solution; and
  washing the treated resin with water and drying the resin to thereby provide a resinous material substantially free of fines that will pass through a 200 mesh screen.

3. The process of treating thermoplastic resins, below their second order transition temperature, to reduce fines therein, comprising the steps of:
  combining a coagulant solution comprised of from about .4 part to about 4 parts concentrated sulfuric acid per 100 parts tap water with a resinous butadiene-styrene-acrylonitrile latex to thereby coagulate the resin in said solution;
  treating said coagulated resin by adding thereto a dilute rubber latex, said rubber latex material being above its second order transition temperature, and coagulating said rubber latex in said coagulant solution;
  said dilute rubber latex being added in sufficient amount to provide a dry rubber to dry resin ratio of one part by weight rubber to 100 parts by weight resin;
  separating the coagulated treated resin from its aqueous solution; and
  washing the treated resin with water and drying the resin to thereby provide a resinous material substantially free of fines.

4. The process of treating thermoplastic resins below their second order transition temperature, to reduce fines therein, comprising the steps of:
  combining an aqueous coagulant solution comprised of about 4 parts to about 8 parts concentrated sulfuric acid per 100 parts tap water and an $\alpha$-methylstyrene-styrene-acrylonitrile resin latex to thereby coagulate said resin in said solution;
  treating said coagulated resin by adding thereto a dilute rubber latex, said rubber being a material above its second order transition temperature;
  coagulating said rubber latex in said coagulant solution;
  said dilute rubber latex solution being added in sufficient amount to provide a dry rubber to dry resin ratio of one part by weight rubber to 100 parts by weight resin;
  separating the coagulated treated resin from its aqueous solution; and
  washing the treated resin with water and drying the resin to thereby provide resinous material substantially free of fines.

5. The process of treating thermoplastic resins below their second order transition temperatures, to reduce fines therein, comprising the steps of:
  combining an acrylonitrile-styrene resin latex with an aqueous coagulant solution comprised of about .5 part aluminum sulfate per 100 parts tap water to coagulate the resin therein;
  treating said coagulated resin by adding thereto a dilute rubber latex, said rubber being above its second order transition temperature;
  coagulating said rubber latex in said coagulant solution, said dilute rubber latex being added in sufficient amount to provide a dry rubber to dry resin ratio of one part by weight rubber to 100 parts by weight resin;
  separating the coagulated treated resin from its aqueous solution; and
  washing the treated resin with water and drying the resin, thereby providing a resinous material substantially free of fines.

References Cited by the Examiner

Ludwig et al.: S.N. 330,310, Alien Property Custodian, pub. Apr. 20, 1943, 260-conc. digest.

MURRAY TILLMAN, *Primary Examiner.*

WILLIAM H. SHORT, *Examiner.*

J. W. SANNER, *Assistant Examiner.*